United States Patent
Matsushima

(10) Patent No.: US 9,398,513 B2
(45) Date of Patent: Jul. 19, 2016

(54) COMMUNICATION SYSTEM AND COMPUTER-READABLE RECORDING MEDIUM

(71) Applicant: SoftBank Telecom Corp., Tokyo (JP)

(72) Inventor: Satoru Matsushima, Chiba (JP)

(73) Assignee: SoftBank Corp., Tokyo (JP)

( * ) Notice: Subject to any disclaimer, the term of this patent is extended or adjusted under 35 U.S.C. 154(b) by 91 days.

(21) Appl. No.: 14/572,791

(22) Filed: Dec. 17, 2014

(65) Prior Publication Data

US 2015/0103746 A1    Apr. 16, 2015

Related U.S. Application Data

(63) Continuation of application No. PCT/JP2013/003826, filed on Jun. 19, 2013.

(51) Int. Cl.
  *H04W 40/02*   (2009.01)
  *H04W 88/16*   (2009.01)
  *H04L 29/06*   (2006.01)
  *H04W 76/02*   (2009.01)

(52) U.S. Cl.
  CPC ............... *H04W 40/02* (2013.01); *H04L 69/22* (2013.01); *H04L 69/167* (2013.01); *H04W 76/021* (2013.01); *H04W 88/16* (2013.01)

(58) Field of Classification Search
  CPC ... H04W 40/02; H04W 88/16; H04W 76/021; H04L 69/22; H04L 69/167
  See application file for complete search history.

(56) References Cited

U.S. PATENT DOCUMENTS

| | | | | |
|---|---|---|---|---|
| 2005/0070278 A1* | 3/2005 | Jiang | ..................... | H04W 8/183 455/432.3 |
| 2006/0072592 A1* | 4/2006 | Graves | .................... | H04L 45/02 370/401 |
| 2006/0190458 A1* | 8/2006 | Mishina | ................ | H04L 67/125 |
| 2007/0217402 A1* | 9/2007 | Lin | .................... | H04L 29/06027 370/356 |
| 2009/0235174 A1* | 9/2009 | Royt | ..................... | G06F 3/0613 715/735 |
| 2010/0290396 A1 | 11/2010 | Karunakaran et al. | | |
| 2011/0051683 A1* | 3/2011 | Ramankutty | ..... | H04W 36/0033 370/331 |
| 2011/0116509 A1* | 5/2011 | Moreno | ............. | H04L 12/4625 370/401 |
| 2011/0276668 A1* | 11/2011 | Fang | ....................... | H04L 12/24 709/221 |
| 2011/0286430 A1 | 11/2011 | Zembutsu et al. | | |
| 2012/0117257 A1 | 5/2012 | Huo et al. | | |
| 2012/0290719 A1* | 11/2012 | Lee | ..................... | H04L 12/4641 709/224 |
| 2012/0300615 A1 | 11/2012 | Kempf et al. | | |
| 2012/0303828 A1* | 11/2012 | Young | ..................... | H04L 67/20 709/229 |
| 2013/0034057 A1 | 2/2013 | Aramoto et al. | | |
| 2013/0054761 A1 | 2/2013 | Kempf et al. | | |
| 2013/0142084 A1 | 6/2013 | Tokunaga et al. | | |

OTHER PUBLICATIONS

Office Action issued for counterpart Japanese Application 2014-555438, issued by the Japanese Patent Office on Feb. 3, 2015.

* cited by examiner

*Primary Examiner* — Ajay Cattungal

(57) ABSTRACT

A communication system controls routing performed by a physical gateway that connects a mobile station and a communication network. The communication system comprises a communication setting information acquiring unit and a routing control unit. The communication setting information acquiring unit acquires communication setting information between a virtual gateway corresponding to the physical gateway and the mobile station by executing a communication establishment sequence between the virtual gateway and the mobile station. The routing control unit controls routing performed by the physical gateway based on the communication setting information.

11 Claims, 6 Drawing Sheets

| IPv6 Prefix | Interface | next_hop (eNB S1-U IP_address,TEID) |
|---|---|---|
| 2001:db8:0a0b:0c0d::/64 | gtp0 | eNB S1-U-> 1.1.1.1,TEID-> 0x1a1b1c1d/32 |
| 2001:db8:0a0b:0c00::/56 | gtp0 | eNB S1-U-> 1.1.1.1,TEID-> 0x1a1b1c00/24 |

FIG. 3

COMMUNICATION SYSTEM AND COMPUTER-READABLE RECORDING MEDIUM

The contents of the following Japanese patent applications are incorporated herein by reference: PCT/JP2013/003826 filed on Jun. 19, 2013.

BACKGROUND

1. Technical Field

The present invention relates to a communication system and a computer-readable recording medium.

2. Related Art

Patent Document 1 describes about a system that realizes improvement of transmission delay of user data and efficient use of network resources within an evolved packet core (EPC) by re-selecting a packet data network gateway (PGW) in accordance with movement of user equipment (UE) in the EPC, and re-establishing a default bearer. Patent Document 1: Japanese Patent Application Publication No. 2011-217397

SUMMARY

It is desired to enable more flexible system changes in a communication system like an EPC.

According to an aspect of the present invention, a communication system that controls routing performed by a physical gateway that connects a mobile station and a communication network comprises: a communication setting information acquiring unit that acquires communication setting information between a virtual gateway corresponding to the physical gateway and the mobile station by executing a communication establishment sequence between the virtual gateway and the mobile station; and a routing control unit that controls routing performed by the physical gateway based on the communication setting information.

In the above-described communication system, the communication setting information acquiring unit may acquire, as the communication setting information, network identification information that identifies the communication network, base station identification information that identifies a base station that contains the mobile station, and virtual gateway identification information that identifies the virtual gateway, and the routing control unit may update routing information that is referred to by the physical gateway for controlling routing, based on the network identification information, the base station identification information, and the virtual gateway identification information.

In the above-described communication system, the communication setting information acquiring unit may acquire: as the base station identification information, first tunnel identification information corresponding to the base station for identifying a tunnel that is formed virtually between the virtual gateway and the base station by the communication establishment sequence; and as the virtual gateway identification information, second tunnel identification information corresponding to the virtual gateway for identifying the tunnel, and the routing control unit may update routing information that is referred to by the physical gateway for controlling routing, based on the network identification information, the first tunnel identification information, and the second tunnel identification information.

In the above-described communication system, the communication setting information acquiring unit may acquire: as the first tunnel identification information, an IP address of the base station and a first tunnel identification code that identifies the tunnel and is generated by the base station; and as the second tunnel identification information, an IP address of the virtual gateway and a second tunnel identification code that identifies the tunnel and is generated by the virtual gateway, the routing information may include, in association with each other, a route including a destination IP address, and a next-hop address that indicates a next relay point for the route, and the routing control unit may update the routing information by: generating a destination route corresponding to the mobile station based on the network identification information and the second tunnel identification code; generating a next-hop address corresponding to the destination route of the mobile station based on the IP address of the base station and the first tunnel identification code; and registering, in a routing table, the routing information in which the generated destination route and the generated next-hop address are associated with each other.

In the above-described communication system, upon receiving, from the mobile station, a first packet having an IPv4 header, the base station may encapsulate the first packet by the second tunnel identification information, and transfer the encapsulated first packet to the physical gateway, and after decapsulating the encapsulated first packet, the physical gateway may re-encapsulate the first packet by an IPv6 header including, as a source address, the network identification information, the second tunnel identification code, and an IP address of the mobile station, and send out the re-encapsulated first packet toward the communication network.

In the above-described communication system, upon receiving a second packet having an IPv4 header encapsulated by an IPv6 header intended for the mobile station, the physical gateway may refer to the routing information, specify the first tunnel identification information as a next-hop address corresponding to the network identification information and the second tunnel identification information indicated in a destination address of the IPv6 header of the second packet, re-encapsulate the second packet by the specified first tunnel identification information, and transfer the re-encapsulated second packet to the base station.

In the above-described communication system, upon receiving, from the mobile station, a third packet having an IPv6 header including, as a source address, the network identification information and the second tunnel identification code, the base station may encapsulate the third packet by the second tunnel identification information, and transfer the encapsulated third packet to the physical gateway, and after decapsulating the encapsulated third packet, the physical gateway may send out the third packet toward the communication network.

In the above-described communication system, upon receiving a fourth packet including, as a destination address, the network identification information and the second tunnel identification code as an IPv6 header, the physical gateway may refer to the routing information, specify the first tunnel identification information as a next-hop address corresponding to the network identification information and the second tunnel identification code of the destination address included in the IPv6 header of the fourth packet, encapsulate the fourth packet by the specified first tunnel identification information, and transfer the encapsulated fourth packet to the base station.

In the above-described communication system, the communication setting information acquiring unit and the routing control unit may be arranged on a cloud. The above-described communication system may further comprise the virtual gateway arranged on a cloud. The above-described communication system may further comprise the physical gateway.

The summary clause does not necessarily describe all necessary features of the embodiments of the present invention. The present invention may also be a sub-combination of the features described above.

BRIEF DESCRIPTION OF THE DRAWINGS

FIG. 3 is a diagram that illustrates one example of routing information.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
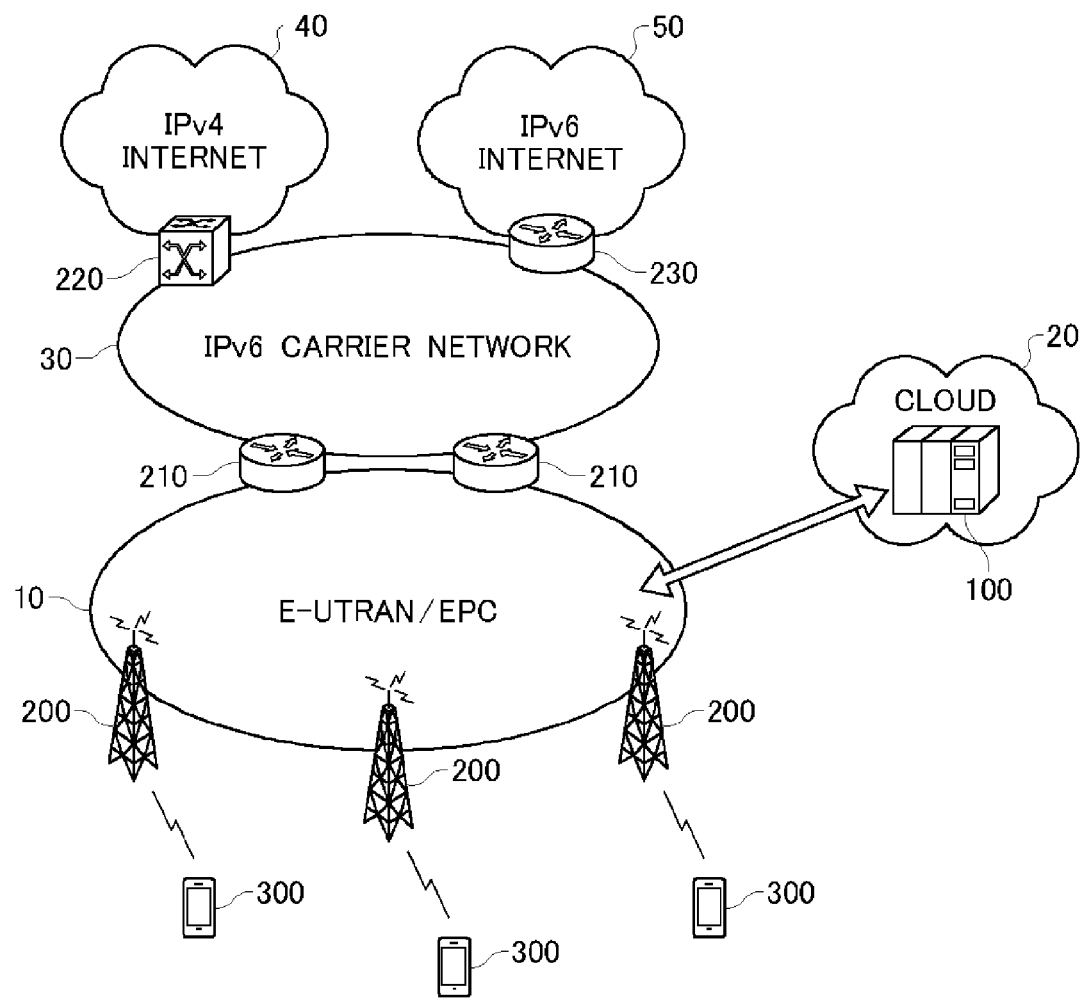
FIG. 1 is a diagram that illustrates one example of the network configuration of a communication system according to the present embodiment.

FIG. 1 is a diagram that illustrates one example of the network configuration of a communication system according to the present embodiment. The communication system includes a virtual service apparatus 100, an eNodeB (base station) 200, an EPCE (EPC Edge) router 210, a V4V6 conversion gateway 220, an IPv6 router 230, and a mobile station (UE) 300.

The eNodeB 200 contains the mobile station 300 that is present in its cell. The eNodeB 200 communicates with the EPCE router 210 via an E-UTRAN/EPC 10. The E-UTRAN/EPC 10 is communicatively connected with a cloud 20. The virtual service apparatus 100 is arranged on the cloud 20.

The EPCE router 210 is a gateway that communicatively connects the E-UTRAN/EPC 10 and an IPv6 carrier network 30. The EPCE router 210 communicates with the V4V6 conversion gateway 220 or the IPv6 router 230 via the IPv6 carrier network 30.

The V4V6 conversion gateway 220 is a gateway that communicatively connects the IPv6 carrier network 30 and an IPv4 Internet 40. The IPv6 router 230 is a gateway that communicatively connects the IPv6 carrier network 30 and an IPv6 Internet 50.

The EPCE router 210 is one example of a physical gateway that connects the mobile station 300 with the IPv4 Internet 40 or the IPv6 Internet 50 that are communication networks.

The virtual service apparatus 100 executes a communication establishment sequence between the virtual service apparatus 100 and the mobile station 300 via the eNodeB 200 that contains the mobile station 300, by transmitting and receiving control data to and from the mobile station 300 via the eNodeB 200 on the control plane. The virtual service apparatus 100 forms a tunnel virtually between the virtual service apparatus 100 and the eNodeB 200, by executing the communication establishment sequence. When the mobile station 300 is handed over from one eNodeB 200 to another eNodeB 200, the virtual service apparatus 100 executes, between the virtual service apparatus 100 and the mobile station 300, the communication establishment sequence via the eNodeB 200 to which the mobile station 300 is handed over and which contains the mobile station 300, and the virtual service apparatus 100 forms a new tunnel virtually between the virtual service apparatus 100 and the eNodeB 200 to which the mobile station 300 is handed over.

The EPCE router 210 transfers, toward the IPv6 carrier network 30, user data received from the mobile station 300 via the eNodeB 200 on the user plane. The EPCE router 210 transfers, to the mobile station 300 via the eNodeB 200, user data that is received from the IPv6 carrier network 30 on the user plane and intended for the mobile station 300.

The EPCE router 210 may retain routing information that is referred to for controlling routing. The routing information is, for example, a routing table that includes, in association with each other, a destination IP address, and a next-hop address that indicates a next relay point for the destination IP address. Upon receiving a packet, the EPCE router 210 refers to the routing information, determines a forward destination of the packet, and transfers the packet to the determined forward destination.

At the time when the mobile station 300 is activated or the mobile station 300 is handed over, the virtual service apparatus 100 updates the routing information of the EPCE router 210 based on communication setting information that is obtained by the communication establishment sequence executed between the virtual service apparatus 100 and the mobile station 300.

The V4V6 conversion gateway 220 is a gateway that communicatively connects the IPv6 carrier network 30 and the IPv4 Internet 40. The V4V6 conversion gateway 220 may be AFTR (Address-Family Translation Router) type equipment as defined in RFC 6333 that, upon receiving an IPv4 packet encapsulated by an IPv6 header via the IPv6 carrier network 30, decapsulates the packet, and then transmits the packet as an IPv4 packet toward the IPv4 Internet 40, or may be 464 XLAT type equipment as defined in RFC 6877 that utilizes NAT 64 and performs conversion of a received IPv6 packet into an IPv4 packet, or the reverse conversion. The V4V6 conversion gateway 220 encapsulates the IPv4 packet received from the IPv4 Internet 40 by an IPv6 header, or performs IPv6 conversion, and then transfers the packet to the EPCE router 210.

The IPv6 router 230 is a gateway that communicatively connects the IPv6 carrier network 30 and the IPv6 Internet 50.

In the thus-configured communication system, the eNodeB 200 communicates control data on the control plane with the virtual service apparatus 100. Also, the eNodeB 200 communicates user data on the user plane with the EPCE router 210. The virtual service apparatus 100 may be arranged on a cloud, and configured with a plurality of apparatuses. Therefore, even when a large amount of control data is exchanged among a large number of the mobile stations 300, processing of control data may be distributed, for example, among a plurality of apparatuses. Also, even if the amount of user data increases, influence on communication of control data between the mobile station 300 and the virtual service apparatus 100 can be suppressed.

Figure 2:
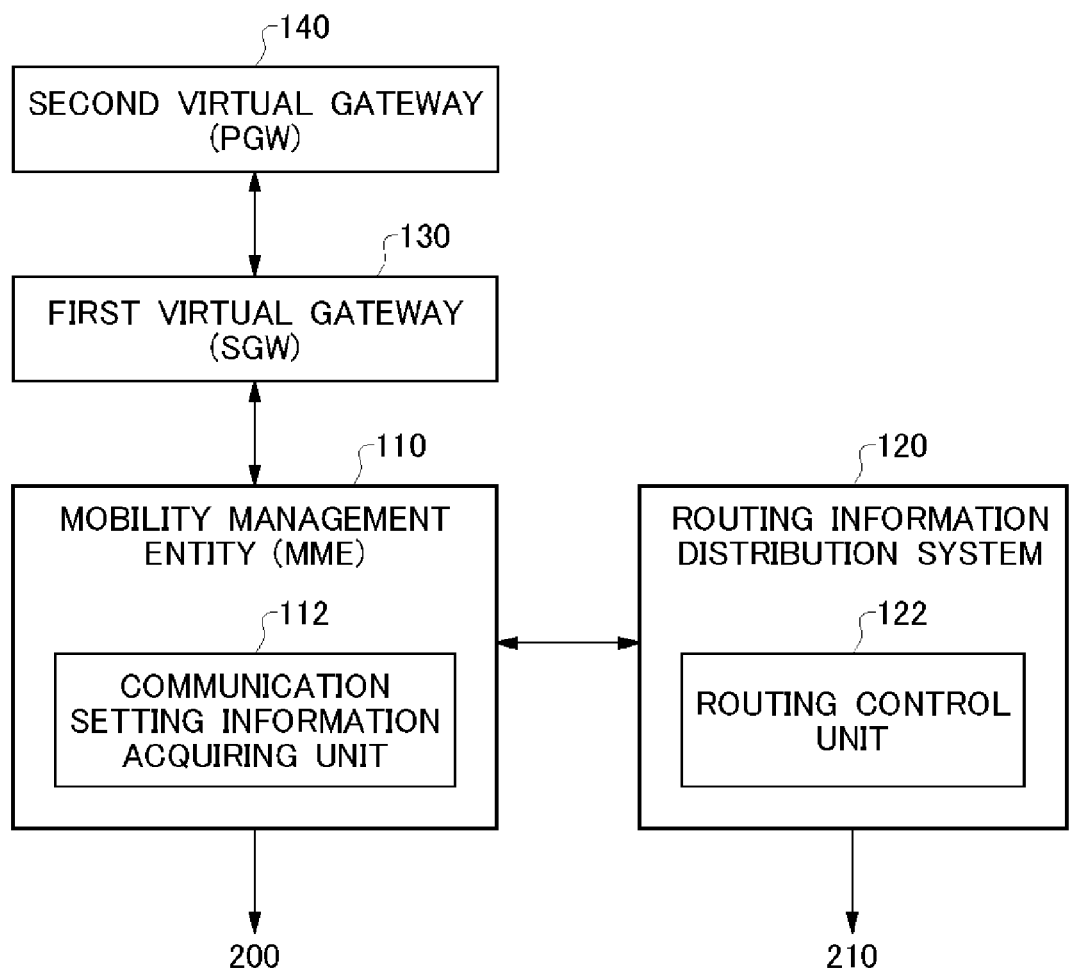
FIG. 2 is a diagram that illustrates one example of functional blocks of a virtual service apparatus.

FIG. 2 is a diagram that illustrates one example of functional blocks of the virtual service apparatus 100. The virtual service apparatus 100 includes a mobility management entity (MME) 110 and a routing information distribution system 120. The virtual service apparatus 100 further includes a first virtual gateway 130 and a second virtual gateway 140 as virtual gateways.

The MME 110 performs movement management of the mobile station 300, and authentication of the mobile station 300 in cooperation with an HSS (Home Subscriber Server). The first virtual gateway 130 functions virtually as an SGW (Serving Gateway). The virtual service apparatus 100 may include at least one first virtual gateway 130 for at least one eNodeB 200.

The second virtual gateway 140 functions virtually as a PGW (Packet Data Network Gateway). The virtual service apparatus 100 may include at least one second virtual gateway 140 for at least one first virtual gateway 130.

The MME 110 has a communication setting information acquiring unit 112. The communication setting information acquiring unit 112 acquires communication setting information between a virtual gateway corresponding to the EPCE router 210 and the mobile station 300 by executing a communication establishment sequence virtually between the virtual gateway and the mobile station 300. When the MME 110 does not have a communication setting information acquiring unit, the respective first virtual gateway 130 may be configured to have the communication setting information acquiring unit 112, and acquire the communication setting information.

The routing information distribution system 120 manages routing information of the EPCE router 210. The routing information distribution system 120 has a routing control unit 122. The routing control unit 122 controls routing performed by the EPCE router 210 based on the communication setting information.

The communication setting information acquiring unit 112 may acquire, as the communication setting information, network identification information (APN) that identifies a communication network to which the mobile station 300 is connected, base station identification information that identifies the eNodeB 200 that contains the mobile station 300, and virtual gateway identification information that identifies the virtual gateway. The routing control unit 122 may update the routing information that is referred to by the EPCE router 210 for controlling routing, based on the network identification information, the base station identification information, and the virtual gateway identification information.

The communication setting information acquiring unit 112 may acquire, as the base station identification information, first tunnel identification information corresponding to the eNodeB 200 for identifying a tunnel that is formed virtually, by the communication establishment sequence, between a virtual gateway and the eNodeB 200 that contains the mobile station 300. The communication setting information acquiring unit 112 may acquire, as the virtual gateway identification information, second tunnel identification information corresponding to a virtual gateway for identifying a tunnel that is formed virtually between a virtual gateway and the eNodeB 200. The routing control unit 122 may update the routing information that is referred to by the physical gateway for controlling routing, based on the network identification information, the first tunnel identification information, and the second tunnel identification information.

The communication setting information acquiring unit 112 may acquire as the first tunnel identification information: an IP address (eNB S1-U Address) of the eNodeB 200 for identifying an inter-eNB-SGW tunnel that is formed virtually, by the communication establishment sequence, between the eNodeB 200 and the first virtual gateway 130; and a first tunnel identification code (eNB TEID) that is generated by the eNodeB 200. The communication setting information acquiring unit 112 may acquire, as the second tunnel identification information: an IP address (SGW S1-U Address) of the first virtual gateway 130 for identifying the inter-eNB-SGW tunnel; and a second tunnel identification code (SGW TEID) that is generated by the first virtual gateway 130.

The routing control unit 122 may generate IPv6 routing information of a destination corresponding to the mobile station 300, based on the network identification information (APN) and the second tunnel identification code (SGW TEID). When the routing control unit 122 generates routing information corresponding to an IPv4 address of the mobile station 300, the routing control unit 122 may generate IPv6 routing information of a destination corresponding to the mobile station 300, based on an IPv4 address (UE Address) of the mobile station 300 that is generated by the second virtual gateway 140, the network identification information (APN), and the second tunnel identification code (SGW TEID). Also, the routing control unit 122 may update the routing table by: generating a next-hop address corresponding to routing information of a destination of the mobile station 300 based on the first tunnel identification information (eNB S1-U Address, eNB TEID); and registering, in the routing table in association with each other, the generated routing information and the next-hop address.

Upon receiving, from the mobile station 300, a first packet having an IPv4 header, the eNodeB 200 encapsulates the first packet by the second tunnel identification code (SGW TEID), and transfers the encapsulated first packet to the EPCE router 210. After decapsulating the encapsulated first packet, the EPCE router 210 re-encapsulates the first packet by an IPv6 header that includes, as a source address, the network identification information (APN), the second tunnel identification code (SGW TEID), and an IP address of the mobile station 300, and sends out the re-encapsulated first packet toward the IPv4 Internet 40 that is a communication network to which the mobile station 300 is connected.

Upon receiving a second packet that has an IPv4 header encapsulated by an IPv6 header, the EPCE router 210 refers to the routing information, and specifies first tunnel identification information (eNB S1-U Address, eNB TEID) as a next-hop address corresponding to the network identification information (APN) and the second tunnel identification code (SGW TEID) indicated in the destination address of the IPv6 header of the second packet. The EPCE router 210 re-encapsulates the second packet by the IP address (eNB S1-U Address) and the first tunnel identification code (eNB TEID) of the eNodeB 200 included in the specified first tunnel identification information, and transfers the re-encapsulated second packet to the eNodeB 200.

Upon receiving, from the mobile station 300, a third packet having an IPv6 header including, as a source address, the network identification information (APN) and the second tunnel identification code (SGW TEID), the eNodeB 200 encapsulates the third packet by the second tunnel identification code, and transfers the encapsulated third packet to the EPCE router 210. After decapsulating the encapsulated third packet, the EPCE router 210 sends out the third packet toward the IPv6 Internet 50.

Upon receiving a fourth packet including, as a destination address of an IPv6 header, the network identification information (APN) and the second tunnel identification code (SGW TEID), the EPCE router 210 refers to the routing information, and specifies the first tunnel identification information (eNB S1-U Address, eNB TEID) as a next-hop address corresponding to the network identification information and the second tunnel identification code included in the destination address of the IPv6 header of the fourth packet.

The EPCE router 210 encapsulate the fourth packet by the IP address (eNB S1-U Address) and the first tunnel identification code (eNB TEID) of the eNodeB 200 included in the specified first tunnel identification information, and transfers the encapsulated fourth packet to the eNodeB 200.

FIG. 3 is a diagram that illustrates one example of routing information retained by the EPCE router 210. The routing information includes an "IPv6 Prefix" corresponding to a destination IP address, an interface "Interface" of an exit corresponding to a next-hop address, and a next-hop address "next_hop (eNB S1-U Address, TEID)".

Here, if the Prefix (subnet number) utilized in the APN that the mobile station 300 connects to is "2001: db8", and the second tunnel identification code generated by the first virtual gateway 130 for identifying the inter-eNB-SGW tunnel formed between the first virtual gateway 130 corresponding to the mobile station 300 and the eNodeB 200 is "0x0a0b0c0d", the EPCE router 210 utilizes a method shown for example in http://tools.ietf.org/html/draft-savolainen-stateless-pd-01 to add, following the APN Prefix, 32 bits of the second tunnel identification code (SGW TEID) generated by the first virtual gateway 130 for identifying the inter-eNB-SGW tunnel to generate "2001:db8:0a0b:0c0d::/64" as an IPv6 prefix of the destination corresponding to the mobile station 300, and notifies the mobile station 300 of the generated IPv6 prefix according to a normal procedure to generate an IPv6 address. The mobile station 300 automatically generates the IPv6 address by using the notified IPv6 prefix.

Also, if the IP address of the eNodeB 200 is "1.1.1.1", and the first tunnel identification code generated by the eNodeB 200 for identifying the inter-eNB-SGW tunnel is "0x1a1b1c1d", the routing control unit 122 generates "eNB S1-U→1.1.1.1, TEID→0x1a1b1c1d/32" as a next-hop address.

Note the next-hop address including TEID may be generated by expanding a format defined in RFC 5512 that defines a next-hop address as a tunnel, such that, for example, GTP is designated as a tunnel type, and the next-hop address including TEID can be represented.

In some cases, the mobile station 300 for example communicates audio packet while being connected to the Internet. In this case, the mobile station 300 establishes a GTP tunnel for the Internet service, and a GTP tunnel for the VoLTE service between itself and the EPCE router 210. The mobile station 300 establishes virtually a plurality of tunnels corresponding to a GTP tunnel for the Internet service and a GTP tunnel for the VoLTE service between itself and the virtual service apparatus 100. In such a case, as a next-hop address for the mobile station 300, the routing information in which a plurality of tunnel endpoint identifiers (TEID) established between the eNodeB 200 corresponding to the mobile station 300 and the EPCE router 210 are associated with each other for an IP address of the eNodeB 200 corresponding to the mobile station 300 may be generated. In this manner, by associating a plurality of TEIDs for a single destination IP address, even when a plurality of tunnels are established for the single mobile station 300, the EPCE router 210 can route a plurality of packets for the plurality of tunnels through the respective tunnels appropriately.

When a plurality of inter-eNB-SGW tunnels are formed virtually between the eNodeB 200 and the first virtual gateway 130 for the mobile station 300 to connect to a plurality of services simultaneously, the first virtual gateway 130 can represent 256 tunnels by a single IPv6 route "2001:db8:0a0b: 0c00::/56" by employing a range of "0x0a0b0c00" to "0x0a0b0cff" as the range for SGW TEID generated for the mobile station 300. Similarly, the eNodeB 200 also may represent the next-hop address corresponding to the above-mentioned IPv6 route "2001:db8:0a0b:0c00::/56" as "eNB S1-U→1.1.1.1,TEID→0x1a1b1c00/24" by employing a range of "0x1a1b1c00" to "0x1a1b1cff" as the range for eNB TEID corresponding to the above-mentioned SGW TEID.

Figure 4:
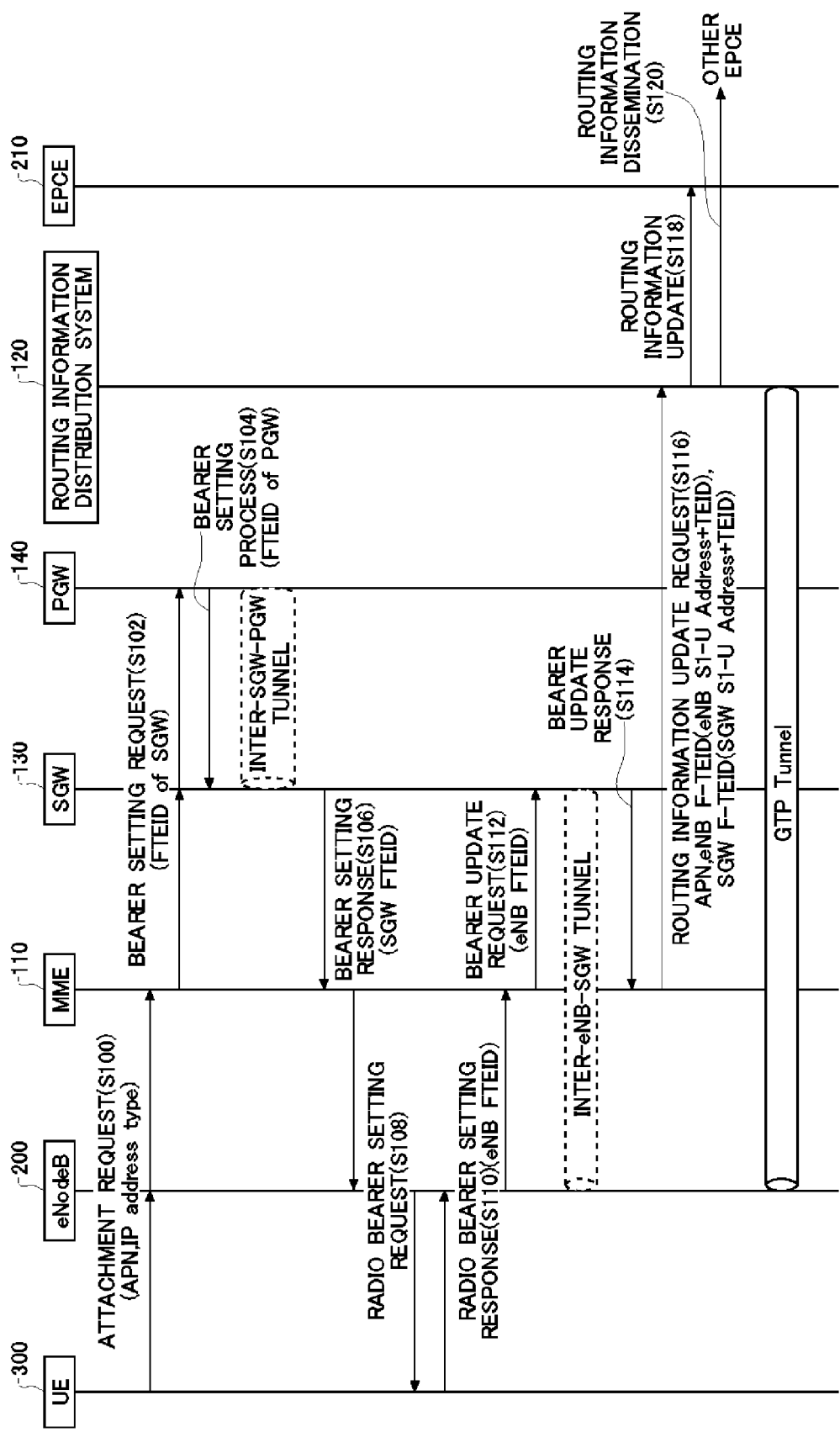
FIG. 4 is a diagram that illustrates one example of a communication establishment sequence to be executed between a mobile station and a virtual service apparatus when the mobile station is activated.

FIG. 4 is a diagram that illustrates one example of a communication establishment sequence to be executed between the mobile station 300 and the virtual service apparatus 100 when the mobile station 300 is activated.

When the mobile station 300 is activated, the mobile station 300 transmits an attachment request signal including an APN that identifies a connection destination communication network, and an IP address type of the connection destination communication network via the eNodeB 200 to the MME 110 (S100). The IP address type indicates any of IPv4, IPv6, or IPv4v6 as the type of an IP address to be allocated to the mobile station 300. Note that when the type of an IP address to be allocated to the mobile station 300 is IPv4v6, this indicates that the IP address to be allocated to the mobile station 300 is both an IPv4 address and an IPv6 address.

The MME 110 that has received the attachment request signal performs authentication of the mobile station 300 by communicating with an HSS, and acquires, from the HSS, contract information necessary for bearer setting. Then, the MME 110 selects the first virtual gateway (SGW) 130 and the second virtual gateway 140 (PGW) which are to be set as bearers by a DNS (domain name system) based on the APN notified by the mobile station 300 in the attachment request signal, and transmits, to the selected first virtual gateway 130, a bearer setting request signal in order to form an inter-SGW-PGW tunnel virtually between the first virtual gateway 130 and the second virtual gateway 140 (S102). By using the bearer setting request signal, the first virtual gateway 130 notifies the second virtual gateway 140 of third tunnel identification (FTEID of SGW) including a third tunnel identification code generated by the first virtual gateway 130 for identifying the inter-SGW-PGW tunnel, and an IP address of the first virtual gateway 130.

The first virtual gateway 130 executes a bearer setting process virtually on the second virtual gateway 140 indicated in the bearer setting request signal (S104). By executing the bearer setting process, an inter-SGW-PGW tunnel is formed virtually between the first virtual gateway 130 and the second virtual gateway 140. In the bearer setting process, the second virtual gateway 140 notifies the first virtual gateway 130 of fourth tunnel identification (FTEID of PGW) including a fourth tunnel identification code generated by the second virtual gateway 140 for identifying the inter-SGW-PGW tunnel, and an IP address of the second virtual gateway 140.

When the bearer setting is completed, that is, when the inter-SGW-PGW tunnel has been formed virtually, the first virtual gateway 130 transmits a bearer setting response signal to the MME 110 in order to form an inter-eNB-SGW tunnel virtually between the first virtual gateway 130 and the eNodeB 200 (S106). By using the bearer setting response signal, the first virtual gateway 130 notifies the MME 110 of second tunnel identification information (SGW FTEID: SGW S1-U Address, SGW TEID) including a second tunnel identification code (SGW TEID) generated by the first virtual gateway 130 for identifying the inter-eNB-SGW tunnel, and an IP address (SGW S1-U Address) on the side of the eNodeB 200 of the first virtual gateway 130.

Upon receiving the bearer setting response signal, the MME 110 notifies the eNodeB 200 of, as a radio bearer setting request signal, the second tunnel identification information (SGW FTEID) indicated in the bearer setting response signal (S108). The radio bearer setting request signal includes an attachment acceptance signal intended for the mobile station 300.

Upon receiving the radio bearer setting request signal, the eNodeB 200 establishes a wireless bearer between itself and the mobile station 300, and at the same time, transmits the attachment acceptance signal to the mobile station 300. Next, the eNodeB 200 receives a radio bearer setting response signal from the mobile station 300, and notifies the MME 110 of, as transmission information intended for the first virtual gateway 130, first tunnel identification information (eNB FTEID: eNB S1-U Address, eNB TEID) including the first tunnel identification code (eNB TEID) generated by eNodeB 200 for identifying the inter-eNB-SGW tunnel, and an IP address of the eNodeB 200 (S110).

Next, by transmitting a bearer update request signal to the first virtual gateway 130, the MME 110 notifies the first virtual gateway 130 of the first tunnel identification information received from the eNodeB 200 (S112). The first virtual gateway 130 forms an inter-eNB-SGW tunnel virtually between itself and the eNodeB 200 based on the received first tunnel identification information, and transmits a bearer update response signal to the MME 110 (S114).

When the inter-eNB-SGW tunnel has been formed virtually, the communication setting information acquiring unit 112 of the MME 110 notifies the routing information distribution system 120 of a routing information update request signal including the network identification information (APN), the first tunnel identification information (eNB FTEID: eNB S1-U Address, eNB TEID), and the second tunnel identification information (SGW FTEID: SGW SI-U Address, SGW TEID) that are acquired in the above-mentioned communication establishment sequence (S116).

Upon receiving the routing information update request signal, the routing control unit 122 of the routing information distribution system 120 generates a destination route corresponding to the mobile station 300 based on the network identification information (APN) and the second tunnel identification code (SGW TEID). Also, the routing control unit 122 generates a next-hop address corresponding to the destination route of the mobile station 300 based on the first tunnel identification information (eNB S1-U Address, eNB TEID).

Next, the routing information distribution system 120 transmits, to the EPCE router 210, a routing information updating signal including routing information consisting of the generated destination route and the generated next-hop address (S118). Upon receiving the routing information updating signal, the EPCE router 210 registers the routing information indicated in the routing information updating signal in the routing table, and updates the routing table. The routing information distribution system 120 disseminates the routing information generated by the routing control unit 122 to all the EPCE routers 210 that are related to the routing information (S120). A routing information distribution system for distributing the routing information to a plurality of EPCE routers may use route reflector (RR) type equipment that is defined in RFC 4456 and distributes the routing information by using the BGP (Border Gateway Protocol), or XMPP or other PubSub systems.

The EPCE router 210 transmits and receives, to and from the mobile station 300 via the eNodeB 200, user data on the user plane via a GTP tunnel, as if there is an inter-eNB-SGW tunnel between itself and the eNodeB 200 based on the routing table updated by the routing information updating signal.

As described above, the virtual service apparatus 100 arranged on the cloud 20 executes the communication establishment sequence with the mobile station 300 via the eNodeB 200 by transmitting and receiving the control data on the control plane to and from the eNodeB 200. By the virtual service apparatus 100 executing the communication establishment sequence, the communication setting information acquiring unit 112 acquires, as the communication setting information, the network identification information, the base station identification information, and the virtual gateway identification information. The routing control unit 122 updates the routing information that is referred to by the EPCE router 210 for controlling routing based on the network identification information, the base station identification information, and the virtual gateway identification information.

The eNodeB 200 transmits and receives the control data on the control plane to and from the virtual service apparatus 100, and transmits and receives the user data on the user plane to and from the EPCE router 210. The virtual service apparatus 100 may be configured with a plurality of apparatuses arranged on a cloud. Accordingly, even when exchanging a large amount of control data with a large number of the mobile stations 300 at once, processing of control data may be distributed, for example, among a plurality of apparatuses that function as the virtual service apparatus 100. Also, even if the processing of user data increases, negative influence on processing of control data can be suppressed because an apparatus to process control data and an apparatus to process user data are physically separated.

Figure 5:
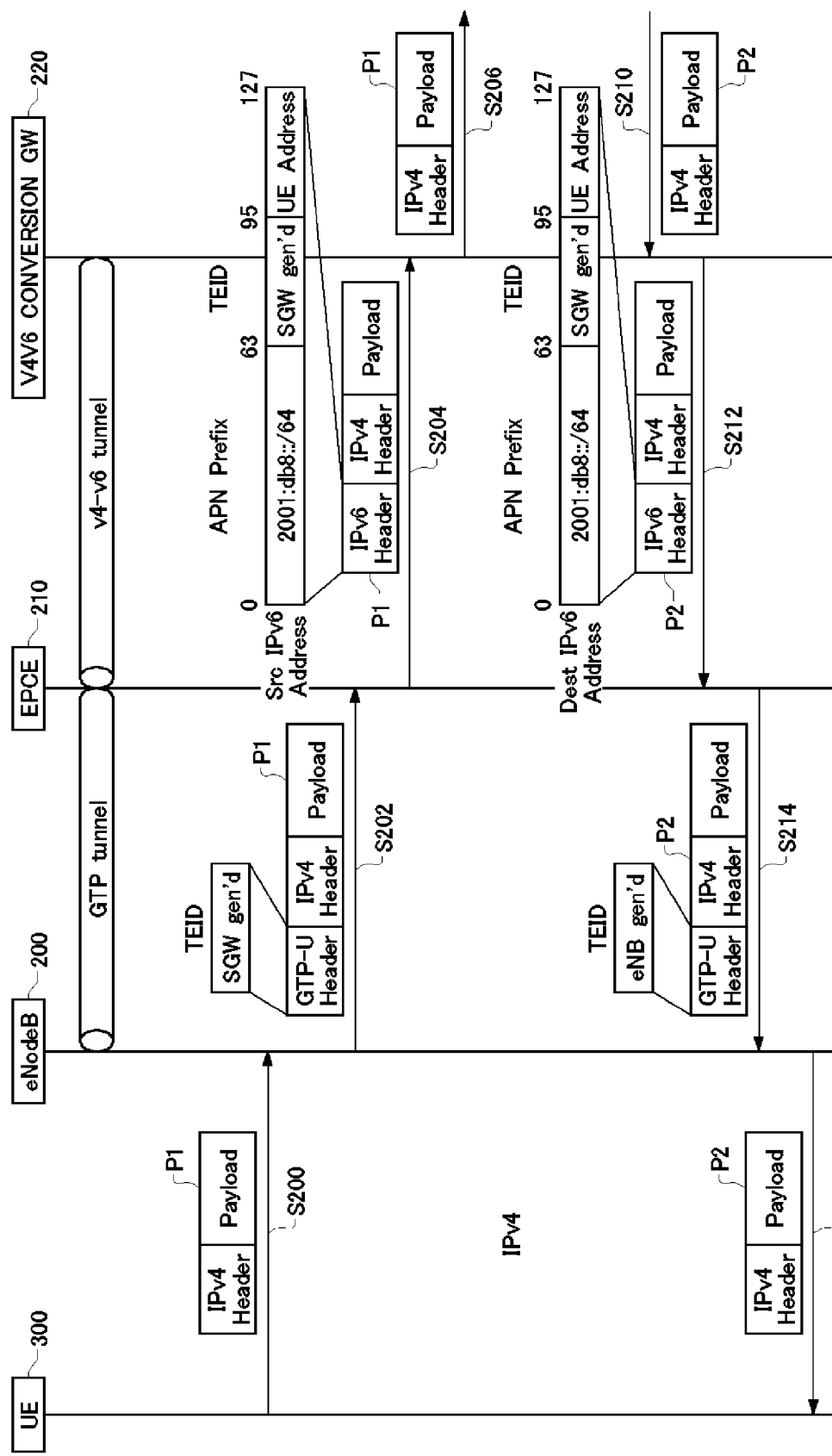
FIG. 5 is a diagram that illustrates a sequence to be performed when a mobile station transmits and receives an IPv4 packet.

FIG. 5 shows a sequence in which the mobile station 300 transmits an IPv4 packet to the IPv4 Internet 40, and a sequence in which the mobile station 300 receives an IPv4 packet from the IPv4 Internet 40.

The mobile station 300 transmits a packet P1 having an IPv4 header to the eNodeB 200 (S200). The eNodeB 200 encapsulates the packet P1 by an IP header whose destination address is an SGW S1-U IP address, and a GTP header including a second tunnel identification code (SGW TEID), and transfers the encapsulated packet P1 to the EPCE router 210 (S202). Here, the E-UTRAN/EPC 10 that is a network to transfer the packet P1 is configured to direct, to the EPCE router 210, the packet whose destination address is the SGW S1-U IP address.

After decapsulating the packet P1, the EPCE router 210 refers to the IPv4 header of the packet P1, and specifies the APN and the IP address (UE Address) of the mobile station 300. The EPCE router 210 performs re-encapsulation or IPv6 conversion of the decapsulated packet P1 by an IPv6 header including, as a source address, the network identification information (APN), the second tunnel identification code (SGW TEID), and the IP address (UE Address) of the mobile station 300, and transmits the packet P1 that has been converted to conform to IPv6 to the IPv6 carrier network toward the V4V6 conversion gateway 220 (S204). The V4V6 conversion gateway 220 decapsulates the received packet P1, removes the IPv6 header, or performs IPv4 conversion, and sends out the packet toward the IPv4 Internet 40 that is a communication network to which the mobile station 300 is connected (S206).

When the V4V6 conversion gateway 220 receives the packet P2 having the IPv4 header and intended for the mobile station 300 (S210), the V4V6 conversion gateway 220 specifies the IPv6 address including the network identification information (APN), the second tunnel identification code (SGW TEID), and the IP address (UE Address) of the mobile station 300 from the IP address (UE Address) of the mobile station 300 that is a destination indicated in the IPv4 destination address, performs encapsulation or IPv6 conversion of the packet P2 by the IPv6 header whose destination address is the specified IPv6 address, and transmits the packet P2 that has been converted to conform to IPv6 to the EPCE router 210 (S212).

Upon receiving the packet P2, the EPCE router 210 refers to the routing information, specifies the first tunnel identification information (eNB S1-U Address, eNB TEID) as a next-hop address corresponding to the network identification information (APN) and the second tunnel identification code (SGW TEID) indicated in the IPv6 destination address, and then performs decapsulation or IPv4 conversion of the packet P2. The EPCE router 210 re-encapsulates the packet P2 by the IP header whose destination address is the eNB S1-U Address of the eNodeB 200 included in the specified first tunnel identification information, and the GTP header including the first tunnel identification code (eNB TEID), and transfers the re-encapsulated packet P2 to the eNodeB 200 (S214).

After decapsulating the received packet P2, the eNodeB 200 transmits the packet P2 to the mobile station 300 having a radio bearer corresponding to the eNB TEID indicated in the GTP header (S216).

Figure 6:
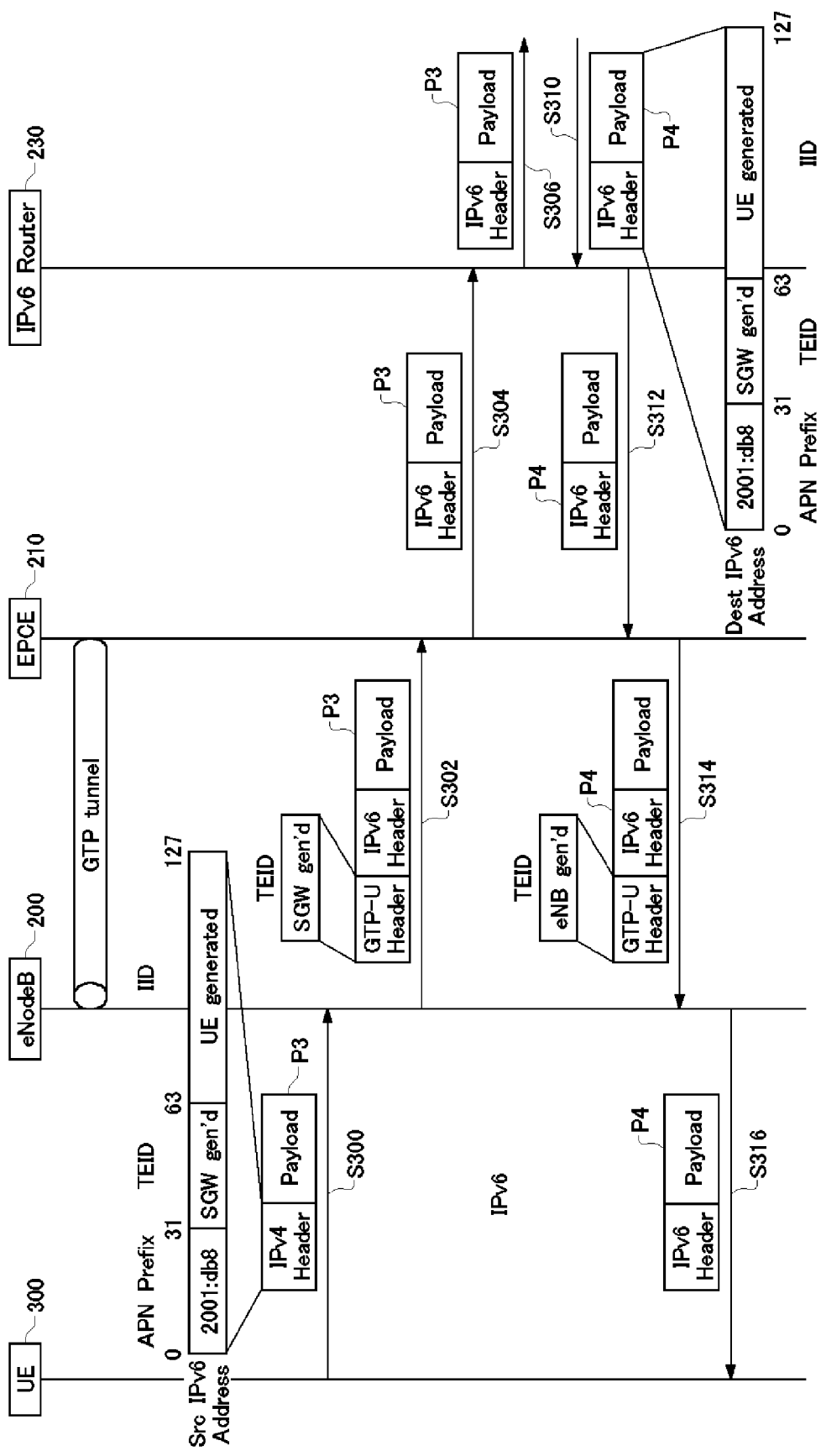
FIG. 6 is a diagram that illustrates a sequence to be performed when a mobile station transmits and receives an IPv6 packet.

FIG. 6 shows a sequence in which the mobile station 300 transmits an IPv6 packet to the IPv6 Internet 50, and a sequence in which the mobile station 300 receives an IPv6 packet from the IPv6 Internet 50.

The mobile station 300 transmits, to the eNodeB 200, an IPv6 packet P3 having an IPv6 header including, as a source address, the network identification information (APN) and the second tunnel identification code (SGW TEID) (S300).

The eNodeB 200 encapsulates the received packet P3 by a GTP header including an IP header whose destination address is the SGW S1-U IP address, and a second tunnel identification code (SGW TEID), and transmits the packet to the EPCE router 210 (S302). Here, the E-UTRAN/EPC 10 that is a network to transfer the packet P1 is configured to direct, to the EPCE router 210, the packet whose destination address is the SGW S1-U IP address. After decapsulating the packet P3, the EPCE router 210 transmits the packet P3 to the IPv6 carrier network 30 as a result of routing based on the routing table and the IPv6 destination address of the packet P3. When the packet P3 heads to the IPv6 Internet 50, the IPv6 router 230 receives the packet P3 (S304). The IPv6 router 230 transmits the received packet P3 toward the IPv6 Internet 50 (S306).

When the IPv6 router 230 receives an IPv6 packet P4 having an IPv6 header including, as a destination address, the network identification information (APN), and the second tunnel identification code (SGW TEID) (S310), the IPv6 router 230 transfers the packet P4 to the IPv6 carrier network 30 toward the EPCE router 210 (S312). Here, the IPv6 carrier network 30 is configured to direct, to the EPCE router 210, the IPv6 packet including, as a destination address, the network identification information (APN) and the second tunnel identification code (SGW TEID).

Upon receiving the packet P4, the EPCE router 210 refers to the routing information, and specifies the first tunnel identification information (eNB S1-U Address, eNB TEID) as a next-hop address corresponding to the network identification information and the second tunnel identification code included in the IPv6 destination address of the packet P4. The EPCE router 210 encapsulates the packet P4 by an IP header whose destination address is an IP address (eNB S1-U Address) of the eNodeB 200 included in the specified first tunnel identification information, and a GTP header including the first tunnel identification code (eNB TEID), and transfers the encapsulated packet P4 to the eNodeB 200 (S314).

The eNodeB 200 decapsulates the packet P4, and transmits the packet P4 to the mobile station 300 having a radio bearer corresponding to the eNB TEID indicated in the GTP header of the packet P4 (S316).

As described above, according to the present embodiment, the virtual service apparatus 100 to process control data communicated on the control plane, and the EPCE router 210 to process user data communicated on the user plane are physically separated. Thereby, even when the load of processing on control data or user data has increased due to the increase in the number of the mobile stations 300, systems can be changed flexibly and separately according to the load of the respective processing.

Also, because the virtual service apparatus 100 arranged on a cloud is caused to execute processing of control data, even when the load of processing on control data or user data has increased due to the increase in the number of the mobile stations 300, systems can be changed easily for example by additionally providing apparatuses that are caused to function as the virtual service apparatus 100.

Note that each unit included in the virtual service apparatus 100 according to the present embodiment may be configured by installing, in a computer, a program that performs various processing about the communication establishment sequence and routing, and is recorded in a computer-readable recoding medium, and causing the computer to execute the program. That is, the virtual service apparatus 100 may be configured by causing a computer to execute a program that performs various processing about the communication establishment sequence and routing of the virtual service apparatus 100, thereby causing the computer to function as each unit included in the virtual service apparatus 100.

The computer has a CPU, various memories such as a ROM, a RAM, or an EEPROM (registered trademark), a communication bus, and an interface, and functions as the virtual service apparatus 100 by allowing the CPU to read out and sequentially execute a processing program that has been stored in the ROM as firmware.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A communication system that controls routing performed by a physical gateway that connects a mobile station and a communication network, the communication system comprising:
   a communication setting information acquiring unit that acquires communication setting information between a virtual gateway corresponding to the physical gateway and the mobile station by executing a communication establishment sequence between the virtual gateway and the mobile station; and a routing control unit that controls routing performed by the physical gateway based on the communication setting information, wherein the communication setting information acquiring unit acquires, as the communication setting information, network identification information that identifies the communication network, base station identification information that identifies a base station that contains the mobile station, and virtual gateway identification information that identifies the virtual gateway, and the routing control unit updates routing information that is referred to by the physical gateway for controlling routing, based on the network identification information, the base station identification information, and the virtual gateway identification information.

2. The communication system according to claim 1, wherein the communication setting information acquiring unit acquires: as the base station identification information, first tunnel identification information corresponding to the base station for identifying a tunnel that is formed virtually between the virtual gateway and the base station by the communication establishment sequence; and as the virtual gateway identification information, second tunnel identification information corresponding to the virtual gateway for identifying the tunnel, and the routing control unit updates routing information that is referred to by the physical gateway for controlling routing, based on the network identification information, the first tunnel identification information, and the second tunnel identification information.

3. The communication system according to claim 2, wherein the communication setting information acquiring unit acquires: as the first tunnel identification information, an IP address of the base station and a first tunnel identification code that identifies the tunnel and is generated by the base station; and as the second tunnel identification information, an IP address of the virtual gateway and a second tunnel identification code that identifies the tunnel and is generated by the virtual gateway, the routing information includes, in association with each other, a route including a destination IP address, and a next-hop address that indicates a next relay point for the route, and the routing control unit updates the routing information by: generating a destination route corresponding to the mobile station based on the network identification information and the second tunnel identification code; generating a next-hop address corresponding to the destination route of the mobile station based on the IP address of the base station and the first tunnel identification code; and registering, in a routing table, the routing information in which the generated destination route and the generated next-hop address are associated with each other.

4. The communication system according to claim 3, wherein upon receiving, from the mobile station, a first packet having an IPv4 header, the base station encapsulates the first packet by the second tunnel identification information, and transfers the encapsulated first packet to the physical gateway, and after decapsulating the encapsulated first packet, the physical gateway re-encapsulates the first packet by an IPv6 header including, as a source address, the network identification information, the second tunnel identification code, and an IP address of the mobile station, and sends out the re-encapsulated first packet toward the communication network.

5. The communication system according to claim 3, wherein, upon receiving a second packet having an IPv4 header encapsulated by an IPv6 header intended for the mobile station, the physical gateway refers to the routing information, specifies the first tunnel identification information as a next-hop address corresponding to the network identification information and the second tunnel identification information indicated in a destination address of the IPv6 header of the second packet, re-encapsulates the second packet by the specified first tunnel identification information, and transfers the re-encapsulated second packet to the base station.

6. The communication system according to claim 3, wherein upon receiving, from the mobile station, a third packet having an IPv6 header including, as a source address, the network identification information and the second tunnel identification code, the base station encapsulates the third packet by the second tunnel identification information, and transfers the encapsulated third packet to the physical gateway, and after decapsulating the encapsulated third packet, the physical gateway sends out the third packet toward the communication network.

7. The communication system according to claim 3, wherein upon receiving a fourth packet including, as a destination address, the network identification information and the second tunnel identification code as an IPv6 header, the physical gateway refers to the routing information, specifies the first tunnel identification information as a next-hop address corresponding to the network identification information and the second tunnel identification code of the destination address included in the IPv6 header of the fourth packet, encapsulates the fourth packet by the specified first tunnel identification information, and transfers the encapsulated fourth packet to the base station.

8. The communication system according to claim 1, wherein the communication setting information acquiring unit and the routing control unit are arranged on a cloud.

9. The communication system according to claim 1, further comprising the virtual gateway arranged on a cloud.

10. The communication system according to claim 1, further comprising the physical gateway.

11. A computer-readable medium having instructions stored thereon that, when executed by a processor, cause the processor to perform operations comprising:

acquiring, using a communication setting information acquiring unit, communication setting information between a virtual gateway corresponding to the physical gateway and the mobile station by executing a communication establishment sequence between the virtual gateway and the mobile station; and controlling, using a routing control unit, routing performed by the physical gateway based on the communication setting information, wherein the acquiring using the communication setting information acquiring unit further includes acquiring, as the communication setting information, network identification information that identifies the communication network, base station identification information that identifies a base station that contains the mobile station, and virtual gateway identification information that identifies the virtual gateway, and the controlling using the routing control unit further includes updating routing information that is referred to by the physical gateway for controlling routing, based on the network identification information, the base station identification information, and the virtual gateway identification information.

\* \* \* \* \*